United States Patent
Tang (10) Patent No.: US 9,582,854 B2
(45) Date of Patent: Feb. 28, 2017

(54) IMAGE PROCESSING METHOD AND SYSTEM

(71) Applicant: TENCENT TECHNOLOGY (SHENZHEN) COMPANY LIMITED, Shenzhen (CN)

(72) Inventor: Shengfu Tang, Shenzhen (CN)

(73) Assignee: TENCENT TECHNOLOGY (SHENZHEN) COMPANY LIMITED (CN)

(*) Notice: Subject to any disclaimer, the term of this patent is extended or adjusted under 35 U.S.C. 154(b) by 0 days.

(21) Appl. No.: 14/299,641

(22) Filed: Jun. 9, 2014

(65) Prior Publication Data

US 2014/0285489 A1  Sep. 25, 2014

Related U.S. Application Data

(63) Continuation of application No. PCT/CN2012/086012, filed on Dec. 6, 2012.

(30) Foreign Application Priority Data

Dec. 9, 2011 (CN) .......................... 2011 1 0409768

(51) Int. Cl.
*G06T 5/00* (2006.01)
*G06T 3/40* (2006.01)

(52) U.S. Cl.
CPC . *G06T 5/00* (2013.01); *G06T 3/40* (2013.01)

(58) Field of Classification Search
None
See application file for complete search history.

(56) References Cited

U.S. PATENT DOCUMENTS

| | | | | |
|---|---|---|---|---|
| 5,831,872 A * | 11/1998 | Pan | ...................... | H04N 19/132 341/65 |
| 5,901,254 A * | 5/1999 | Iguchi | .................. | G06T 3/4023 382/298 |
| 7,839,424 B1 * | 11/2010 | Clark | ..................... | G09G 5/393 345/571 |

(Continued)

FOREIGN PATENT DOCUMENTS

| | | |
|---|---|---|
| CN | 101762967 A | 6/2010 |
| CN | 102074001 A | 5/2011 |
| CN | 102214362 A | 10/2011 |

OTHER PUBLICATIONS

Aho, Eero, et al. "Block-level parallel processing for scaling evenly divisible images." Circuits and Systems I: Regular Papers, IEEE Transactions on 52.12 (2005): 2717-2725.*

(Continued)

*Primary Examiner* — Sultana M Zalalee
(74) *Attorney, Agent, or Firm* — Cantor Colburn LLP (57) ABSTRACT

According to an example, an original image is divided into image blocks according to a preset size, at least one pixel is overlapped between adjacent image blocks, a target image block is obtained after performing reduction processing for each of the image blocks according to a reduction factor, coordinates of the target image block are obtained according to the reduction factor and coordinates of the image block; and the target image blocks are combined according to the coordinates of the target image blocks.

10 Claims, 4 Drawing Sheets

(56) References Cited

U.S. PATENT DOCUMENTS

| | | | |
|---|---|---|---|
| 2001/0017942 A1* | 8/2001 | Kalevo | H04N 19/593 382/238 |
| 2003/0048951 A1* | 3/2003 | Rengakuji | H04N 1/41 382/232 |
| 2005/0053290 A1* | 3/2005 | Wada | H04N 19/563 382/233 |
| 2006/0093036 A1* | 5/2006 | Park | H04N 19/31 375/240.12 |
| 2007/0154114 A1* | 7/2007 | Tzeng | G06T 3/4023 382/300 |
| 2008/0068346 A1 | 3/2008 | Naganawa | |
| 2009/0122084 A1* | 5/2009 | Yu | G06T 3/4007 345/660 |
| 2011/0243436 A1* | 10/2011 | Seregin | H04N 19/00533 382/166 |

OTHER PUBLICATIONS

International Search Report issued Mar. 14, 2013 re: PCT/CN2012/086012; pp. 4; citing: CN 102214362 A, CN 101762967 A and US 2008068346 A1.
Chinese Office Action issued May 6, 2014 re: Application No. 201110409768.0; citing: CN102214362A and CN102074001A; pp. 4-12.

* cited by examiner

IMAGE PROCESSING METHOD AND SYSTEM

CROSS REFERENCE TO RELATED APPLICATIONS

This application is a continuation of International Application No. PCT/CN2012/086012, filed on Dec. 6, 2012, which claims priority to Chinese Patent Application No. 201110409768.0, filed on Dec. 9, 2011, the entire contents of all of said applications are incorporated herein by reference in their entirety for all purposes.

TECHNICAL FIELD

The present disclosure relates to computer technologies, and more particularly, to an image processing method and system.

BACKGROUND

With the development of computer technologies, real-time interactive games are increasingly popular. In the real-time interactive game, scene pictures vary with movements of characters, at the same time, the scene pictures may be scaled according to operations of users. The visual range of the scene pictures displaying to the user also will be consequently expanded or reduced.

Generally, in conventional processing for the pictures in real-time interactive scenes, a picture is divided into image blocks in accordance with a certain size, and then the image blocks are processed respectively. For example, the image blocks may be loaded, reduced or magnified. By processing the image blocks, processing speed is improved, and storage space required in the processing procedure is reduced. However, when performing reduction processing for the picture, since the size of the picture is in units of pixels, the size of the image block after the reduction is an integer, rather than a floating point number which is obtained according to a reduction factor, white "cracks" between two adjacent image blocks will occur after the reduction processing, which will affect the smoothness and aesthetic of the picture.

SUMMARY

Examples of the present disclosure provide an image processing method and system, so as to improve overall smoothness of an image when the image is reduced.

An image processing method includes:
dividing an original image into image blocks according to a preset size, at least one pixel being overlapped between adjacent image blocks;
obtaining a target image block after performing reduction processing for each of the image blocks according to a reduction factor;
obtaining coordinates of the target image block according to the reduction factor and coordinates of the image block; and
combining the target image blocks according to the coordinates of the target image blocks.

An image processing system includes:
a dividing module, to divide an original image into image blocks according to a preset size, and at least one pixel being overlapped between adjacent image blocks;
a reduction processing module, to obtain a target image block after performing reduction processing for each of the image blocks according to a reduction factor;
a coordinate calculating module, to obtain coordinates of the target image block according to the reduction factor and coordinates of the image block; and
a combining module, to combine the target image blocks according to the coordinates of the target image blocks.

According to the above image processing method and system, the original image is divided according to the preset size, and at least one column/row of pixels are overlapped between the adjacent image blocks. Because of the at least one column/row of common pixels between the adjacent image blocks, when performing the reduction process for the image block, the white "cracks" between adjacent target image blocks will not occur, thereby improving the overall smoothness of the image after the reduction processing.

An image processing method includes:
dividing an original image into image blocks according to a preset size;
obtaining a target image block after performing reduction processing for each of the image blocks according to a reduction factor;
obtaining coordinates of the target image block according to the reduction factor and coordinates of the image block;
combining the target image blocks according to the coordinates of the target image blocks; copying at least one column/row of pixels in an edge of a first target image block and adding the at least one column/row of pixel to an edge of a second target image block; the edge of the second target image block being against the edge of the first target image block, and the at least one column/row of pixels being connected with the second target image block; the first target image block and the second target image block referring to two adjacent target image blocks respectively.

An image processing system includes:
a dividing module, to divide an original image into image blocks according to a preset size;
a reduction processing module, to obtain a target image block after performing reduction processing for each of the image blocks according to a reduction factor;
a coordinate calculating module, to obtain coordinates of the target image block according to the reduction factor and coordinates of the image block; and
a combining module, to combine the target image blocks according to the coordinates of the target image blocks; copy at least one column/row of pixels in an edge of a first target image block and adding the at least one column/row of pixel to an edge of a second target image block; the edge of the second target image block being against the edge of the first target image block, and the at least one column/row of pixels being connected with the second target image block; the first target image block and the second target image block referring to two adjacent target image blocks respectively.

According to the example, the at least one column/row of pixels in the edge of the first target image block is copied and added to the edge of the second target image block, the edge of the second target image block is against the edge of the first target image block, and the at least one column/row of pixels are connected with the second target image block. In this way, the at least one column/row of pixels may cover possible white "cracks" between the adjacent target image blocks. Therefore, overall smoothness of the image is improved.

DETAILED DESCRIPTION

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various examples given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed as A only, B only, C only, or any combination of two or more items A, B and C. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the embodiments of the present invention in conjunction with the accompanying drawings in FIGS. 1-8. It should be understood that specific embodiments described herein are merely intended to explain the present invention, but not intended to limit the present invention. In accordance with the purposes of this invention, as embodied and broadly described herein, this invention, in one aspect, relates to image processing method and system.

Examples of mobile terminals that can be used in accordance with various embodiments include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to those skilled in the art.

Figure 1:
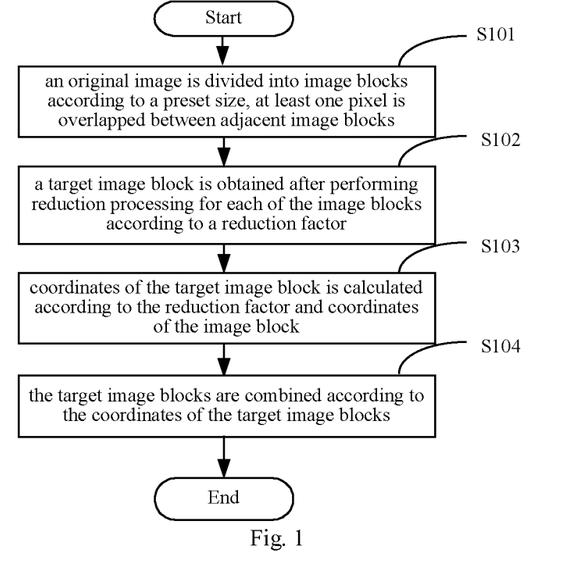
FIG. 1 is a schematic flowchart illustrating an image processing method according to an example of the present disclosure.

FIG. 1 is a schematic flowchart illustrating an image processing method according to an example of the present disclosure. As shown in FIG. 1, the image processing method includes the following processing.

At S101, an original image is divided into image blocks according to a preset size, at least one pixel is overlapped between adjacent image blocks.

Figure 2:
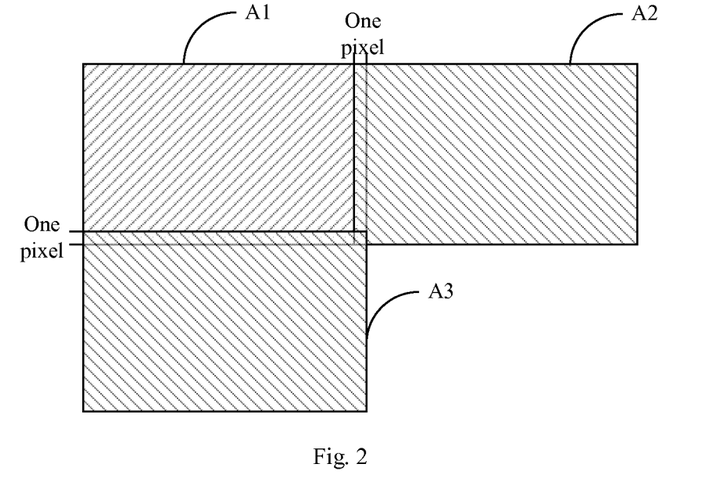
FIG. 2 is a schematic diagram illustrating segmented images according to an example of the present disclosure.

According to various examples of the present disclosure, the size of the image is in units of pixels. According to an example, the original image is divided into image blocks according to the preset size. As shown in FIG. 2, an image block A1 and an image block A2 are adjacent image blocks in a horizontal direction, and one column of pixels are overlapped between the image block A1 and the image block A2. The image block A1 and an image block A3 are adjacent image blocks in a vertical direction, and one row of pixels are overlapped between the image block A1 and the image block A3. According to an example, the sizes of the image blocks are the same.

At S102, a target image block is obtained after performing reduction processing for each of the image blocks according to a reduction factor.

When the reduction processing needs to be performed for the original image, the reduction processing may be performed for each of the image blocks, and the target image block of each of the image blocks is obtained. By performing the reduction processing for the image blocks, processing speed is improved.

According to an example, at S102, the size of the target image block is calculated according to the size of the image block and the reduction factor, and the reduction processing is performed for the image block according to the size of the target image block.

Since the size of the image is in units of pixels and can only be an integer, the size of the target image block is obtained by rounding a product of the size of image block and the reduction factor. For example, the size of the image block is 11×22, the reduction factor is 0.75, and thus the size of the target image block is 8×16.

According to an example, conventional image reduction processing methods may be used to reduce the image block, such as, a snapshot method, an average method, a bilinear method and etc. The snapshot method may be used to accelerate the processing speed.

At S103, coordinates of the target image block is calculated according to the reduction factor and coordinates of the image block.

The coordinates of the image block refer to coordinates of all pixels in the image block. The coordinates of the pixel refer to a column number and a row number of the pixel in the image block including the pixel, or a column number and a row number of the pixel in a screen displaying the pixel. For example, the pixel is located at the column 1024, row 800 of the screen, then the coordinates of the pixel with respect to the screen are (1024, 800).

After the reduction processing is performed for the image block, the coordinates of the target image block may be calculated according to the reduction factor and the coordinates of the image block.

According to an example, the coordinates of the image block may be identified by coordinates of 4 vertex pixels of the image block, since coordinates of each of the remaining pixels in the image block may be obtained according to the coordinates of the 4 vertex pixels and the relative position between the remaining pixel and the 4 vertices. According to an example, the coordinates of the image block may be identified by coordinates of a reference point in the image block, and coordinates of each of the remaining pixels in the image block may be obtained according to the coordinates of the reference point and the relative position between the remaining pixel and the reference point.

According to an example, at S103, the coordinates of the reference point in the image block is obtained, coordinates of a reference point in the target image block corresponding to the image block is obtained according to the coordinates of the reference point in the image block and the reduction factor.

According to an example, one pixel in the image block is be configured as a reference point, and coordinates of the reference point is obtained. A product of the coordinates of the reference point in the image block and the reduction factor is obtained, and the product after rounding is taken as coordinates of the reference point in the target image block corresponding to the image block. For example, the coordinates of the reference point in the image block are (10, 10), the reduction factor is 0.75, then the coordinates of the reference point in the target image block is calculated as: (10, 10)×0.75, and is (7, 7) after rounding.

At S104, the target image blocks are combined according to the coordinates of the target image blocks.

According to an example, the target image block may be combined according to the coordinates of the reference point in the target image block and a position of the reference point of the target image block in the target image block.

According to an example, the position of the reference point of the target image block in the target image block is consistent with the position of the reference point of the image block in the image block. For example, when the reference point of the image block is the upper left vertex of the image block, the reference point of the target image block is also the upper left vertex of the target image block.

According to an example, coordinates of other pixels in the target image block may be calculated according to the coordinates of the reference point in the target image block, and the position of the reference point of the target image block in the target image block.

The relative position between the remaining pixel and the reference point may be obtained according to the position of the reference point of the target image block in the target image block, and the coordinates of the remaining pixel may be calculated according to the relative position between the remaining pixel and the reference point and the coordinates of the reference point. For example, the reference point of the target image block is the upper left vertex of the target image block, the coordinates of the reference point in the target image block are (7, 7), the size of the target image block is 8×16, then the coordinates of an upper right vertex of the target image block may be calculated as (7+8−1, 7), i.e. (14, 7); the coordinates of a lower left vertex of the target image block are (7, 7+16−1), i.e. (7, 22).

Further, the target image blocks may be combined according to the coordinates of all pixels in the target image block. According to an example, the target image blocks may be combined according to a certain order, such as an order that from left to right or from top to bottom, or an order of the coordinates of the reference point in the target image block. If the adjacent target image blocks have overlapped pixels, the pixels spliced currently cover the pixels spliced last.

According to the above solutions, the original image is divided, the coordinates of the target image block is obtained, and the target image blocks are combined according to the coordinates of the target image block. Therefore, the white "cracks" between adjacent target image blocks will not occur.

Figure 3:
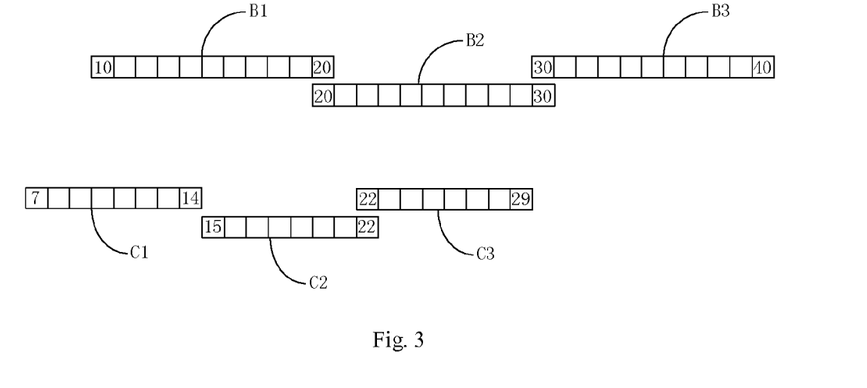
FIG. 3 is a schematic diagram illustrating relative positions of pixels after reduction processing is performed according to an example of the present disclosure.

FIG. 3 is a schematic diagram illustrating relative positions of pixels after reduction processing is performed according to an example of the present disclosure.

As shown in FIG. 3, B1, B2, B3 are first rows of pixels in three target image blocks adjacent in the horizontal direction respectively. In order to facilitate annotation, the B1, B2, B3 in FIG. 3 are staggered in the horizontal position, while the horizontal position of which in actual image is the same.

In the example, the length of each of the B1, B2, B3 is 11, the abscissa of the first pixel of B1 is 10. According to the processing at S101, one pixel is overlapped between the adjacent image blocks when the original image is divided, the abscissas of the first pixel of B2, B3 may be obtained. The abscissas of the first pixel of B2, B3 are 20, 30 respectively, and the abscissas of the last pixel of B1, B2, B3 are 20, 30, 40 respectively.

C1, C2, C3 are target image pixels obtained after the reduction processing is performed for the B1, B2, B3 respectively, and the reduction factor is 0.75.

In the example, the first pixels of B1, B2, B3 are configured as the reference points of the above three adjacent image blocks respectively, then the first pixels of C1, C2, C3 are the reference points of target image blocks corresponding to the above three adjacent image blocks respectively. The abscissa of the reference point (i.e. the first pixel) of C1 is 10×0.75, and is 7 after rounding. Since the length of the C1 is 11×0.75, and is 8 after rounding, then the abscissa of the last pixel of C1 is 7+8−1=14. Similarly, the abscissa of the reference point (i.e. the first pixel) of C2 is 20×0.75, i.e. 15, then the abscissa of the last pixel of C2 is 15+8−1=22. Similarly, the abscissa of the reference point of C3 is 22; the abscissa of the last pixel of C3 is 29.

As shown in FIG. 3, the first and the last pixels respectively in the pixels adjacent in the horizontal direction are connected or overlapped, and thus one column of pixels are connected or overlapped between the target image blocks adjacent in the horizontal direction, without spaced one column of pixels, thus the white "cracks" between the target image blocks adjacent in the horizontal direction will not occur.

Furthermore, the white "cracks" between the target image blocks adjacent in the vertical direction will also not occur, the implementation is the same as the that of the horizontal direction, and is not further described herein.

Figure 4:
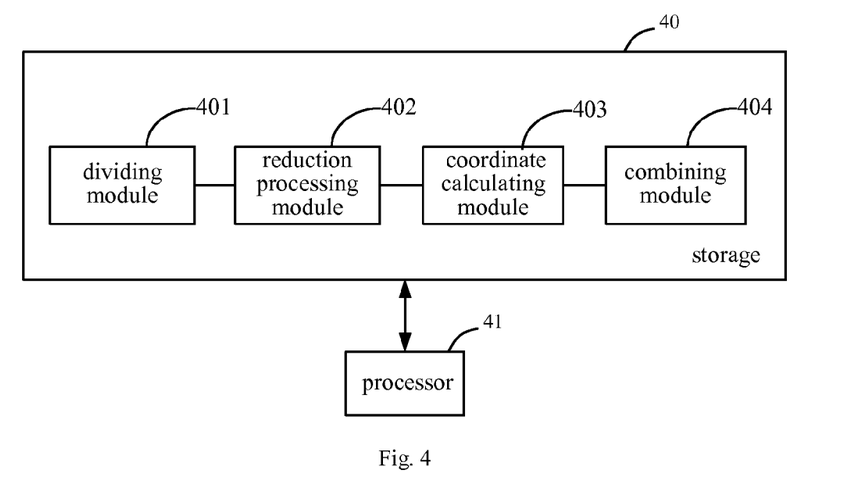
FIG. 4 is a schematic diagram illustrating a structure of an image processing system according to an example of the present disclosure.

FIG. 4 is a schematic diagram illustrating a structure of an image processing system according to an example of the present disclosure.

As shown in FIG. 4, the image processing system includes storage 40 and a processor 41. According to an example, the storage 40 may be non-transitory computer readable storage medium. The storage 40 stores computer readable instructions for implementing a dividing module 401, a reduction processing module 402, a coordinate calculating module 403, and a combining module 404. The processor 41 may execute the computer readable instructions stored in the storage 40.

The dividing module 401 is to divide an original image into image blocks according to a preset size, and at least one pixel is overlapped between adjacent image blocks.

According to various examples of the present disclosure, the size of the image is in units of pixels. According to an example, the dividing module 401 may divide the original image into the image blocks according to the preset size, as shown in FIG. 2. An image block A1 and an image block A2 are adjacent image blocks in a horizontal direction, and one column of pixels are overlapped between the image block A1 and the image block A2. The image block A1 and an image block A3 are adjacent image blocks in a vertical direction, and one row of pixels are overlapped between the image block A1 and the image block A3.

According to an example, the sizes of the image blocks divided by the diving module 401 are the same.

The reduction processing module 402 is to obtain a target image block after performing reduction processing for each of the image blocks according to a reduction factor.

When the reduction processing needs to be performed for the original image, the reduction processing may be performed for each of the image blocks by the reduction processing module 402, and the target image block of each of the image blocks is obtained. By performing the reduction processing for the image blocks, processing speed is improved.

According to an example, the reduction processing module 402 may calculate the size of the target image block according to the size of the image block and the reduction factor, and the reduction processing is performed for the image block according to the size of the target image block.

Since the size of image is in units of pixels and can only be an integer, the size of the target image block is obtained by rounding a product of the size of image block and the reduction factor. For example, the size of the image block is 11×22, the reduction factor is 0.75, and thus the reduction processing module 402 may calculate the size of the target image block as 8×16.

According to an example, conventional image reduction processing methods may be used to reduce the image block, such as, a snapshot method, an average method, a bilinear method and etc. The snapshot method may be used to accelerate the processing speed.

The coordinate calculating module 403 is to calculate coordinates of the target image block according to the reduction factor and coordinates of the image block.

The coordinates of the image block refer to coordinates of all pixels in the image block. The coordinates of the pixel refer to a column number and a row number of the pixel in the image block including the pixel, or a column number and a row number of the pixel in a screen displaying the pixel. For example, the pixel is located at the column 1024, row 800 of the screen, then the coordinates of the pixel with respect to the screen are (1024, 800).

According to an example, after the reduction processing is performed for the image blocks, the coordinate calculating module 403 may calculate the coordinates of the target image block according to the reduction factor and the coordinates of the image block.

According to an example, the coordinates of the image block may be identified by coordinates of 4 vertex pixels of the image block, since coordinates of each of the remaining pixels in the image block may be obtained according to the coordinates of the 4 vertex pixels and the relative position between remaining pixel and the 4 vertices. According to an example, the coordinates of the image block may be identified by coordinates of a reference point in the image block, and coordinates of each of the remaining pixels in the image block may be obtained according to the coordinates of the reference point and the relative position between the remaining pixel and the reference point.

According to an example, the coordinate calculating module 403 is to obtain the coordinates of the reference point in the image block, and obtain coordinates of a reference point in the target image block corresponding to the image block according to the coordinates of the reference point in the image block and the reduction factor.

According to an example, the coordinate calculating module 403 is to configure one pixel in the image block as a reference point, and obtain coordinates of the reference point. Further, the coordinate calculating module 403 is to obtain a product of the coordinates of the reference point in the image block and the reduction factor, and take the product after rounding as coordinates of the reference point in the target image block corresponding to the image block. For example, the coordinates of the reference point in the image block are (10, 10), the reduction factor is 0.75, then the coordinates of the reference point in the target image block is calculated as: (10, 10)×0.75, and is (7, 7) after rounding.

The combining module 404 is to combine the target image blocks according to the coordinates of the target image blocks.

According to an example, the combining module 404 is to combine the target image blocks according to the coordinates of the reference points in the target image blocks and the positions of the reference points in the target image block.

According to an example, the position of the reference point of the target image block in the target image block is consistent with the position of the reference point of the image block in the image block. For example, when the reference point of the image block is the upper left vertex of the image block, the reference point of the target image block is also the upper left vertex of the target image block.

According to an example, the combining module 404 is to calculate coordinates of other pixels in the target image block according to the coordinates of the reference point of the target image block, and the position of the reference point of the target image block in the target image block.

The relative position between the remaining pixel and the reference point may be obtained according to the position of the reference point of the target image block in the target image block, and the combining module 404 may calculate the coordinates of the remaining pixel according to the relative position between the remaining pixel and the reference point and the coordinates of the reference point. For example, the reference point of the target image block is the upper left vertex of the target image block, the coordinates of the reference point in the target image block are (7, 7), the size of the target image block is 8×16, then the coordinates of an upper right vertex of the target image block may be calculated as (7+8−1, 7), i.e. (14, 7); the coordinates of a lower left vertex of the target image block are (7, 7+16−1), i.e. (7, 22).

Further, the combining module 404 may combine the target image blocks according to the coordinates of all pixels in the target image block.

According to an example, the combining module 404 may combine the target image blocks according to a certain order, such as an order that from left to right or from top to bottom, or an order of the coordinates of the reference point in the target image block. If the adjacent target image blocks have overlapped pixels, the pixels spliced currently cover the pixels spliced last.

According to the above image processing method and system, the original image is divided, the coordinates of the target image block is obtained, and the target image blocks are combined according to the coordinates of the target image block. Therefore, when performing the reduction process for the image block, the white "cracks" between adjacent target image blocks will not occur, thereby improving the overall smoothness of the image after the reduction processing.

Figure 5:
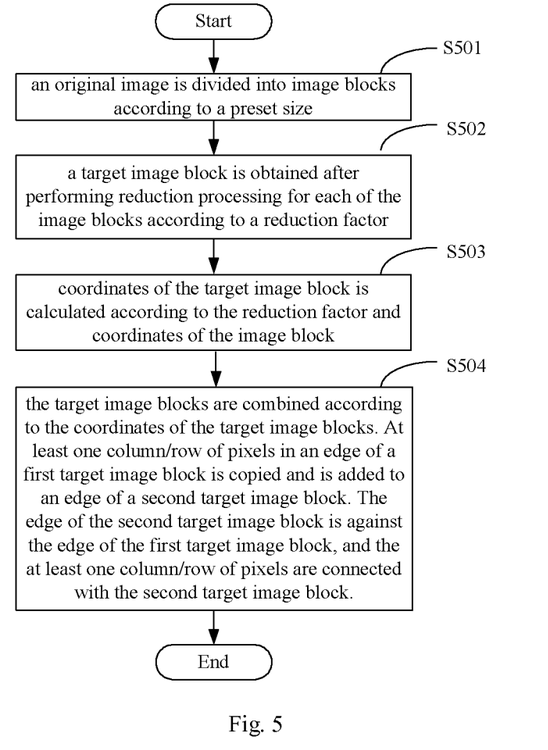
FIG. 5 is a schematic flowchart illustrating an image processing method according to another example of the present disclosure.

FIG. 5 is a schematic flowchart illustrating an image processing method according to another example of the present disclosure. As shown in FIG. 5, the image processing method includes the following processing.

At S501, an original image is divided into image blocks according to a preset size.

Figure 6:
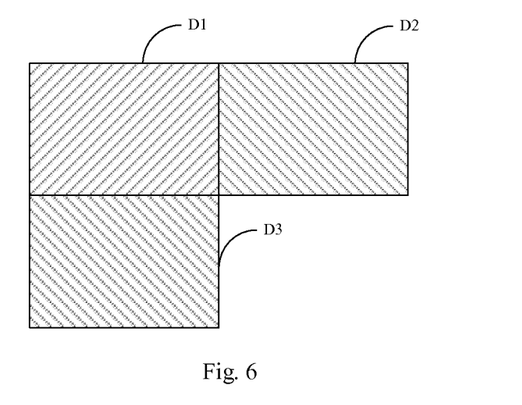
FIG. 6 is a schematic diagram illustrating segmented images according to another example of the present disclosure.

According to an example, as shown in FIG. 6, the original image is divided into image blocks according to the preset size, and image blocks D1, D2, D3 are obtained.

According to an example, the sizes of the image blocks are the same.

At S502, a target image block is obtained after performing reduction processing for each of the image blocks according to a reduction factor.

According to an example, the size of the target image block is calculated according to the size of the image block and the reduction factor, and the reduction processing is performed for the image block according to the size of the target image block.

According to an example, conventional image reduction processing methods may be used to reduce the image block, such as, a snapshot method, an average method, a bilinear method and etc. The snapshot method may be used to accelerate the processing speed.

At S503, coordinates of the target image block is calculated according to the reduction factor and coordinates of the image block.

According to an example, the coordinates of the target image block may be identified by coordinates of a reference point. According to an example, coordinates of a reference point in the image block may be obtained, and then coordinates of a reference point in the target image block corresponding to the image block is obtained according to the coordinates of the reference point in the image block and the reduction factor.

According to an example, when obtaining the coordinates of the reference point in the image block, a position of the reference point of the image block in the image block is configured, the coordinates of the reference point in the image block is calculated according to coordinates of a vertex of the image block and the position of the reference point of the image block in the image block.

At S504, the target image blocks are combined according to the coordinates of the target image blocks. At least one column/row of pixels in an edge of a first target image block is copied and is added to an edge of a second target image block. The edge of the second target image block is against the edge of the first target image block, and the at least one column/row of pixels are connected with the second target image block. The first target image block and the second target image block refer to two adjacent target image blocks respectively.

According to an example, the target image blocks may be combined according to the coordinates of the reference point of the target image block and a position of the reference point of the target image block in the target image block. The position of the reference point of the target image block in the target image block is consistent with the position of the reference point of the image block in the image block.

According to an example, one column of pixels in the rightmost of a target block may be copied and added to the left side of a target image block adjacent to the column of pixels, the column of pixels are connected with the target image block adjacent to the column of pixels. In addition, one row of pixels in the lowermost of the target block may be copied and added to the top of a target image block adjacent to the row of pixels, and the row of pixels are connected with the target image block adjacent to the row of pixels.

According to another example, one column of pixels in the leftmost of a target block may be copied and added to the right side of a target image block adjacent to the column of pixels, and the column of pixel are connected with the target image block adjacent to the column of pixels. In addition, one row of pixels in the uppermost of the target block may be copied and added to the bottom of a target image block adjacent to the row of pixels, and the row of pixels are connected with the target image block adjacent to the row of pixel.

According to the example, the at least one column/row of pixels in the edge of the first target image block is copied and added to the edge of the second target image block, the edge of the second target image block is against the edge of the first target image block, and the at least one column/row of pixels are connected with the second target image block. In this way, the at least one column/row of pixels may cover possible white "cracks" between the adjacent target image blocks. Therefore, overall smoothness of the image is improved.

Figure 7:
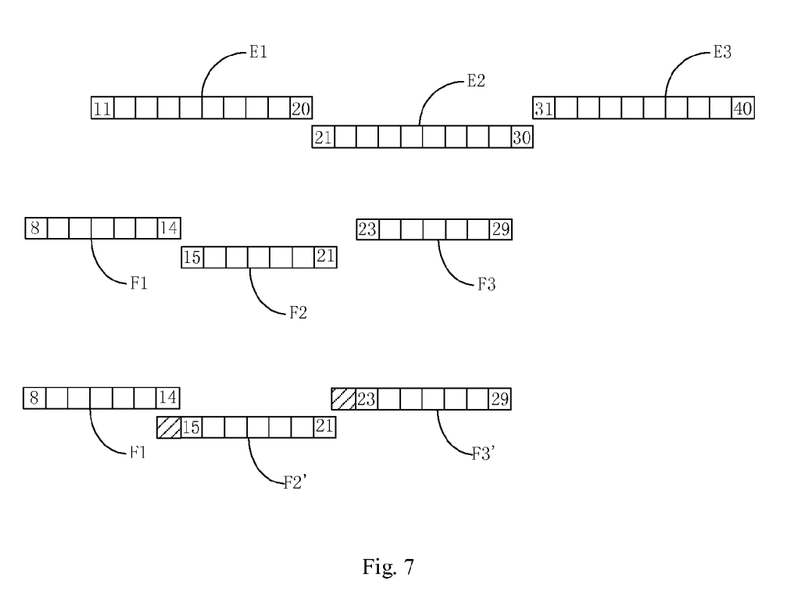
FIG. 7 is a schematic diagram illustrating relative positions of pixels after reduction processing is performed according to another example of the present disclosure.

FIG. 7 is a schematic diagram illustrating relative positions of pixels after reduction processing is performed according to another example of the present disclosure.

As shown in FIG. 7, E1, E2, E3 are first rows of pixels in three target image blocks adjacent in the horizontal direction respectively. In order to facilitate annotation, the E1, E2, E3 in FIG. 7 are staggered in the horizontal position, while the horizontal position of which in actual image is the same.

In the example, the length of each of the E1, E2, E3 is 10, the abscissa of the first pixel of E1 is 11. According to the processing at S501, the abscissas of the first pixel of E2, E3 may be obtained. The abscissas of the first pixel of E2, E3 are 21, 31 respectively, and the abscissas of the last pixel of E1, E2, E3 are 20, 30, 40 respectively.

F1, F2, F3 are target image pixels obtained after the reduction processing is performed for the E1, E2, E3 respectively, and the reduction factor is 0.75.

In the example, the first pixels of E1, E2, E3 are configured as the reference points of the above three adjacent image blocks respectively, the first pixels of F1, F2, F3 are the reference points of target image block corresponding to the above three adjacent image blocks respectively.

Accordingly, the abscissas of the first pixel of F1, F2, F3 are 8, 15, 23 respectively, the abscissas of the last pixels of F1, F2, F3 are 14, 21, 29 respectively. When the target image blocks are combined according to the coordinates, an interval of one pixel (i.e. white "cracks") between the F2 and F3 will occur, and thus an interval of one column of pixels between target image blocks including F2 and F3 will occur.

The ordinate of the pixel in the target image block may be calculated according to the same mode. Similarly, when combining the image blocks according to the coordinates, a row of white "cracks" between target image blocks adjacent in the vertical direction may also occur.

In the example, the rightmost one pixel of F1 and F2 are copied and added to the left side of F2 and F3 respectively, and F2', F3' are obtained. The abscissas of the last pixel of F1 and that of the first pixel of F2' are the same, and the abscissas of the last pixel of F2' and that of the first pixel of F3' are continuous. Therefore, the interval between the target image blocks adjacent in the horizontal direction will no longer occur. Similarly, the lowermost one row of pixels of F1, F2 are copied and added to the top of the target image blocks adjacent to the row of pixels and connected to the target image blocks adjacent to the row of pixels respectively. Therefore, the interval between the target image blocks adjacent in the vertical direction will also no longer occur.

Figure 8:
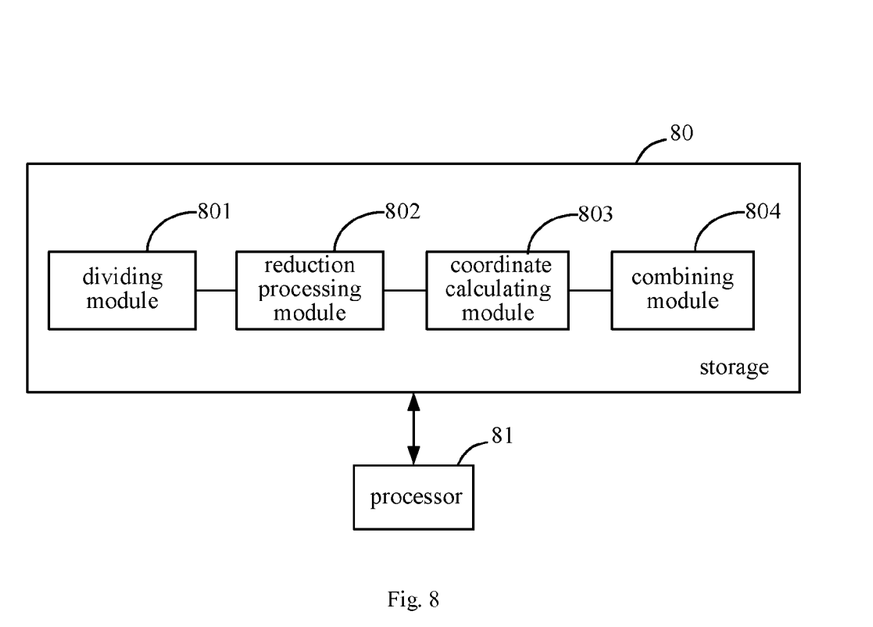
FIG. 8 is a schematic diagram illustrating a structure of an image processing system according to another example of the present disclosure.

FIG. 8 is a schematic diagram illustrating a structure of an image processing system according to an example of the present disclosure.

As shown in FIG. 8, the image processing system includes storage 80 and a processor 81. According to an example, the storage 80 may be non-transitory computer readable storage medium. The storage 80 stores computer readable instructions for implementing a dividing module 801, a reduction processing module 802, a coordinate calculating module 803, and a combining module 804. The processor 81 may execute the computer readable instructions stored in the storage 80.

The dividing module 801 is to divide an original image into image blocks according to a preset size.

As shown in FIG. 6, according to an example, the dividing module 801 is to divide the original image according to the preset size, and image blocks D1, D2, D3 are obtained. According to an example, the sizes of the image blocks are the same.

The reduction processing module 802 is to obtain a target image block after performing reduction processing for each of the image blocks according to a reduction factor.

According to an example, the reduction processing module 802 may calculate the size of the target image block according to the size of the image block and the reduction factor, and the reduction processing is performed for the image block according to the size of the target image block. According to an example, conventional image reduction processing methods may be used to reduce the image block, such as, a snapshot method, an average method, a bilinear method and etc. The snapshot method may be used to accelerate the processing speed.

The coordinate calculating module 803 is to calculate coordinates of the target image block according to the reduction factor and coordinates of the image block.

According to an example, the coordinates of the target image block may be identified by coordinates of a reference point. According to an example, the coordinate calculating module 803 includes an original reference point coordinate obtaining module, a target reference point coordinate obtaining module (not shown in the figure).

The original reference point coordinate obtaining module is to obtain the coordinates of the reference point of the image block. According to an example, the original reference point coordinate obtaining module may configure a position of the reference point of the image block in the image block, and calculate the coordinates of the reference point the image block according to vertex coordinates of the image block and the position of the reference point of the image block in the image block The target reference point coordinate obtaining module is to calculate the coordinates of the reference point in the target image block corresponding to the image block according to the coordinates of the reference point in the image block and the reduction factor.

The combining module 804 is to combine the target image blocks according to the coordinates of the target image block, copy at least one column/row of pixels in an edge of a first target image block and added the at least one column/row of pixels to an edge of a second target image block. The edge of the second target image block is against the edge of the first target image block. The at least one column/row of pixels are connected with the second target image block. The first target image block and the second target image block refer to two adjacent target image blocks respectively.

According to an example, the combining module 804 may combine the target image blocks according to the coordinates of the reference point of the target image block and the position of the reference point of the target image block in the target image block. The position of the reference point of the target image block in the target image block is consistent with the position of the reference point of the image block in the image block.

According to an example, the combining module 804 may copy at least one column of pixels in the rightmost of a target block and added the at least one column of pixels into the left side of a target image block adjacent to the at least one column of pixels and the at least one column of pixels are connected with the target image block adjacent to the at least one column of pixels. In addition, the combining module 804 may copy one column of pixels in the lowermost of the target block and add the one column of pixels into the top of a target image block adjacent to the row of pixels, and the row of pixels are connected with the target image block adjacent to the row of pixels.

According to another example, the combining module 804 may copy one column of pixels in the leftmost of a target block and add the one column of pixels into the right side of a target image block adjacent to the column of pixels, and the column of pixel are connected to the adjacent target image block. In addition, the combining module 804 may copy one row of pixels in the uppermost of the target block and add the one row of pixels into the bottom of a target image block adjacent to the row of pixels, and the row of pixels are connected with the target image block adjacent to the row of pixel.

According to the example, the at least one column/row of pixels in the edge of the first target image block is copied and added to the edge of the second target image block, the edge of the second target image block is against the edge of the first target image block, and the at least one column/row of pixels are connected with the second target image block. In this way, the at least one column/row of pixels may cover possible white "cracks" between the adjacent target image blocks. Therefore, overall smoothness of the image is improved.

The methods, modules and devices described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to realize a technical scheme of any of the above examples.

It will be understood by those ordinary skilled in the art that the implementation of all or part of the process in the method of the foregoing embodiment can be done by controlling the related hardware by computer program, the program may be stored in a computer-readable storage medium, when the program is executing, it may include, such as the process of the embodiment of the method described above. Wherein, the storage medium may be a disk, CD, Read-Only Memory (ROM), Random Access Memory (RAM) et al.

The foregoing is only preferred embodiments of the present invention, and the protection scope of the present invention is not limited to this. Any improvement and replacement which can be made in the technical scope disclosed by the present invention by those skilled in the art should be covered in the protection scope of the invention. And thus, the protection scope of the present invention should be defined by the claims.

The invention claimed is:

1. An image processing method, comprising computer-implemented steps of:
   dividing an original image into image blocks according to a preset size;
   obtaining a target image block after performing reduction processing for each of the image blocks according to a reduction factor;
   obtaining coordinates of the target image block according to the reduction factor and coordinates of the image block;
   combining the target image blocks according to the coordinates of the target image blocks; copying at least one column/row of pixels in an edge of a first target image block and adding the at least one column/row of pixel to an edge of a second target image block; the edge of the second target image block being against the edge of the first target image block, and the at least one column/row of pixels being connected with the second target image block; the first target image block and the second target image block referring to two adjacent target image blocks respectively
   displaying the combined target image blocks.

2. The image processing method of claim 1, wherein obtaining a target image block after performing reduction processing for each of the image blocks according to a reduction factor comprises:
   calculating a size of the target image block according to a size of the image block and a reduction factor;
   performing the reduction process for the image block according to the size of the target image block; and
   obtaining the target image block.

3. The image processing method of claim 1, wherein obtaining coordinates of the target image block according to the reduction factor and coordinates of the image block comprises:
   obtaining coordinates of a reference point of the image block;

calculating coordinates of a reference point of the target image block corresponding to the image block according to the coordinates of the reference point of the image block and the reduction factor.

4. The image processing method of claim 3, wherein combining the target image blocks according to the coordinates of the target image blocks comprises:

combining the target image blocks according to the coordinates of the reference point of the target image block and a position of the reference point of the target image block in the target image block;

the position of the reference point of the target image block in the target image block being consistent with a position of the reference point of the image block in the image block.

5. The image processing method of claim 3, wherein obtaining coordinates of a reference point of the image block comprises:

configuring the position of the reference point of the image block in the image block;

calculating the coordinates of the reference point of the image block according to coordinates of a vertex in the image block and the position of the reference point of the image block in the image block.

6. An image processing system, comprising:

A processor and a non-transitory storage, wherein the non-transitory storage is configured to store one or more modules to be executed by the processor, and the one or more modules comprise:

a dividing module, to divide an original image into image blocks according to a preset size;

a reduction processing module, to obtain a target image block after performing reduction processing for each of the image blocks according to a reduction factor;

a coordinate calculating module, to obtain coordinates of the target image block according to the reduction factor and coordinates of the image block;

a combining module, to combine the target image blocks according to the coordinates of the target image blocks; copy at least one column/row of pixels in an edge of a first target image block and adding the at least one column/row of pixel to an edge of a second target image block; the edge of the second target image block being against the edge of the first target image block, and the at least one column/row of pixels being connected with the second target image block; the first target image block and the second target image block referring to two adjacent target image blocks respectively; and a module, to display the combined target image blocks.

7. The image processing system of claim 6, wherein the reduction processing module is to calculate a size of the target image block according to a size of the image block and the reduction factor; perform the reduction process for the image block according to the size of the target image block; and obtain the target image block.

8. The image processing system of claim 6, wherein the coordinate calculating module comprises:

an original reference point coordinate obtaining module, to obtain coordinates of a reference point of the image block;

a target reference point coordinate obtaining module, to calculate coordinates of a reference point of the target image block corresponding to the image block according to the coordinates of the reference point of the image block and the reduction factor.

9. The image processing system of claim 8, wherein the combining module is to combine the target image blocks according to the coordinates of the reference point of the target image block and a position of the reference point of the target image block in the target image block; copying the at least one column/row of pixels in the edge of the first target image block and adding the at least one column/row of pixel to the edge of the second target image block;

the position of the reference point of the target image block in the target image block is consistent with the position of the reference point of the image block in the image block.

10. The image processing system of claim 8, wherein the original reference point obtaining module is to configure the position of the reference point of the image block in the image block; and calculate the coordinates of the reference point of the image block according to coordinates of a vertex in the image block and the position of the reference point of the image block in the image block.

* * * * *